United States Patent
Safian et al.

(12) 
(10) Patent No.: US 6,670,007 B1
(45) Date of Patent: Dec. 30, 2003

(54) MULTILAYER CONTAINER

(75) Inventors: John W. Safian, Maumee, OH (US); Joseph E. Olsavsky, Waterville, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 0 days.

(21) Appl. No.: 09/287,934

(22) Filed: Apr. 7, 1999

(51) Int. Cl.$^7$ .............................. A61J 9/00; A61J 9/08; B29C 49/22; B29C 49/26
(52) U.S. Cl. .................. 428/36.91; 428/35.2; 428/35.4; 428/35.7; 428/36.6; 428/36.7; 215/11.3; 215/12.11; 215/902; 222/107
(58) Field of Search .............................. 428/34.6, 34.7, 428/36.6, 475.5, 476.1, 35.2, 35.4, 35.7, 36.7, 36.91; 264/37.1

(56) References Cited

U.S. PATENT DOCUMENTS

| | | | |
|---|---|---|---|
| 3,781,395 A | 12/1973 | Uhlig | 264/89 |
| 4,174,783 A | 11/1979 | Abe et al. | 215/12.2 |
| 4,558,792 A | 12/1985 | Cabernoch et al. | 215/11 R |
| 4,567,069 A | 1/1986 | Jabarin | 428/35 |
| 4,657,151 A * | 4/1987 | Cabernoch | 215/11 E |
| 4,705,708 A | 11/1987 | Briggs et al. | 428/35 |
| H469 H | 5/1988 | Deak | 428/476.3 |
| 4,755,405 A | 7/1988 | Massucco et al. | 428/35 |
| 4,762,748 A * | 8/1988 | Oberle | 428/349 |
| 4,894,291 A * | 1/1990 | Ofstein | 428/518 |
| 5,242,085 A | 9/1993 | Richter et al. | 222/105 |
| RE34,537 E | 2/1994 | Deyrup | 428/35.7 |
| 5,301,838 A | 4/1994 | Schmidt et al. | 222/95 |
| 5,316,135 A | 5/1994 | Kneer et al. | 220/461 |
| 5,320,889 A | 6/1994 | Bettle, III | 428/36.7 |
| 5,344,045 A | 9/1994 | Richter et al. | 222/1 |
| 5,407,629 A | 4/1995 | Schmidt | 264/512 |
| 5,435,452 A | 7/1995 | Nishigami et al. | 215/12.1 |
| 5,447,678 A | 9/1995 | Kneer et al. | 264/515 |
| 5,513,761 A | 5/1996 | Kobayashi et al. | 215/12.1 |
| 5,534,317 A | 7/1996 | Herman et al. | 428/35.7 |
| 5,552,198 A | 9/1996 | Hiltner et al. | 428/35.7 |
| 5,567,377 A | 10/1996 | Nishigami et al. | 264/515 |
| 5,601,891 A | 2/1997 | Herman et al. | 428/35.7 |
| 5,693,283 A * | 12/1997 | Fehn | 264/513 |
| 5,712,009 A | 1/1998 | Moore | 428/35.7 |
| 5,799,809 A | 9/1998 | Sako et al. | 215/12.1 |

FOREIGN PATENT DOCUMENTS

EP       0182094       10/1985

* cited by examiner

Primary Examiner—Harold Pyon
Assistant Examiner—Sow-Fun Hon

(57) ABSTRACT

A multilayer container for dispensing product that includes a relatively rigid outer body and a relatively flexible inner liner for holding product to be dispensed. The relatively rigid outer body includes, and preferably consists essentially of, an outer layer of virgin polyethylene such as HDPE, and an inner thicker layer that includes polyethylene regrind. The relatively flexible inner liner includes, and preferably consists essentially of, an outer delamination layer adjacent to the inner layer of the body and composed of nylon, nylon blends or EVOH, an inner layer of polyethylene such as LLDPE, and an adhesive securing the inner and outer layers of the liner. The relatively thin outer HDPE layer on the plastic body provides desired appearance, while the thicker inner layer provides structural rigidity using reground plastics. The nylon, nylon blend or EVOH outer liner layer provides improved barrier properties against migration of water, gases and flavorants, while the inner layer of LLDPE provides primarily enhanced flexibility and freedom from cracking, as well as additional barrier moisture qualities.

16 Claims, 2 Drawing Sheets

MULTILAYER CONTAINER

The present invention is directed to multilayer containers, and more particularly to containers that comprise a relatively rigid outer plastic body and a relatively flexible inner plastic liner.

BACKGROUND AND SUMMARY OF THE INVENTION

It has heretofore been proposed to provide a container in the form of a relatively rigid outer plastic body and a relatively flexible inner plastic liner. The container body has a dispensing opening at one end and an atmospheric vent at the opposing end. The inner liner is coupled to the dispensing opening. When containers of this type are employed in conjunction with pump or spray dispensers, for example, the inner liner delaminates from and collapses within the outer plastic body as product is dispensed, with air entering through the atmospheric vent between the outer body and the collapsing liner.

As the liner collapses when the product is dispensed, stress cracks or pinholes can appear along the folds and creases of the liner, causing product leakage and loss. It is therefore a general object of the present invention to provide a multilayer container of the subject type in which the liner readily delaminates from the relatively rigid plastic body as product is dispensed, in which the liner provides not only improved barrier properties but also improved flexibility for elimination of stress cracks and pinholes. Another object of the present invention is to provide a container of the subject type that exhibits reduced product weight loss as compared with structures in the prior art. Yet another object of the invention is to provide a multilayer container of the described character that employs plastic regrind in the container package to promote recycling of moils and scrap.

A multilayer container for dispensing product includes a relatively rigid outer plastic body and a relatively flexible inner plastic liner for holding product to be dispensed. In accordance with one aspect of the present invention, the relatively rigid outer body includes, and preferably consists essentially of, an outer layer of virgin polyethylene such as HDPE, and an inner thicker layer that includes process regrind. In accordance with another aspect of the invention, the relatively flexible inner liner includes, and preferably consists essentially of, an outer delamination layer adjacent to the inner layer of the body and composed of nylon, nylon blends or EVOH, an inner layer of polyethylene such as LLDPE, and an adhesive securing the inner and outer layers of the liner. The relatively thin outer HDPE layer on the plastic body provides desired appearance, while the thicker inner layer provides structural rigidity using reground plastics. The nylon, nylon blend or EVOH outer liner layer provides improved barrier properties against migration of water, gases and flavorants, while the inner layer of LLDPE provides enhanced flexibility, freedom from cracking and additional barrier properties.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 2:
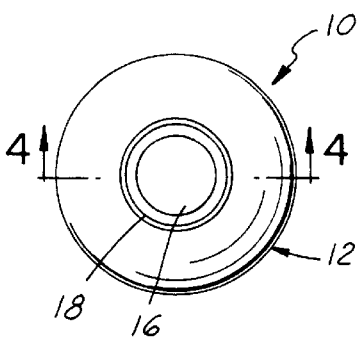
FIG. 2 is a top plan view of the container illustrated in FIG. 1.
Figure 1:
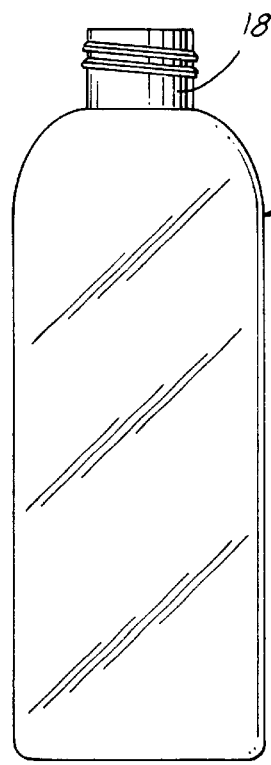
FIG. 1 is an elevational view of a multilayer container in accordance with a presently preferred embodiment of the invention.
Figure 4:
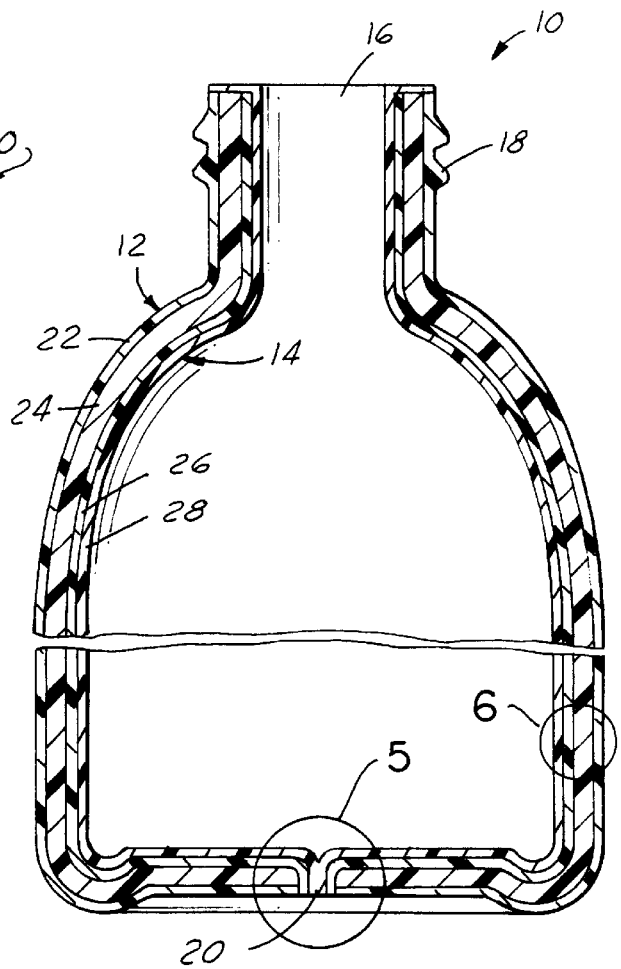
FIG. 4 is a sectional view taken substantially along the line 4—4 in FIG. 2.
Figure 3:
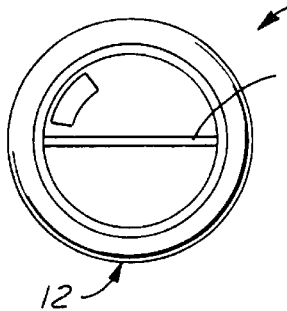
FIG. 3 is a bottom plan view the container illustrated in FIG. 1.
Figure 5:
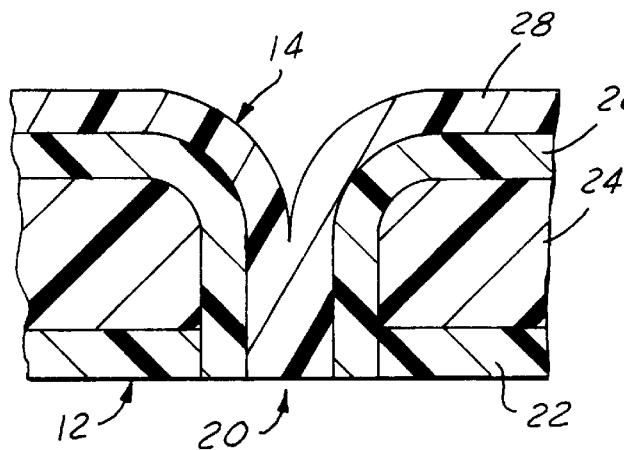
FIG. 5 is an enlarged fragmentary sectional view of the portion of FIG. 4 within the circle 5.
Figure 6:
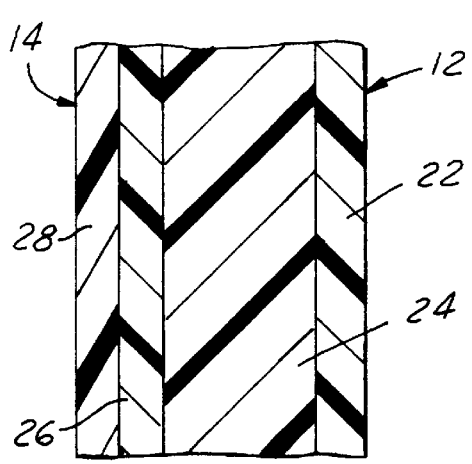
FIG. 6 is an enlarged fragmentary sectional view of the portion of FIG. 4 within the circle 6.
Figure 6A:
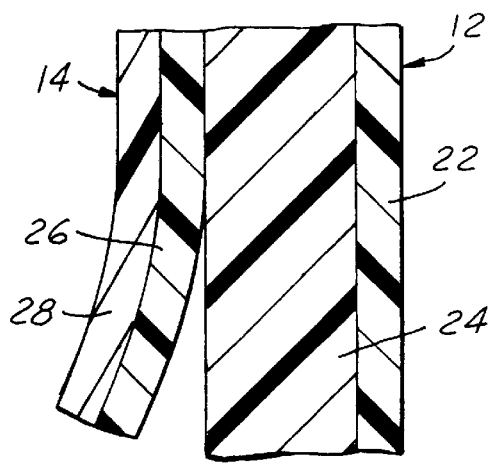
FIG. 6A illustrates delamination of the structure illustrated in FIG. 6.

The drawings illustrate a container 10 in accordance with a presently preferred embodiment of the invention as comprising a relatively rigid outer plastic body 12 and a relatively flexible inner plastic liner 14. Body 12 has a dispensing opening 16 surrounded by a container finish 18 at one end of the body, and an atmospheric vent 20 disposed at the opposing end of the body. Inner liner 14 communicates with opening 16 at finish 18 of container body 12, and is otherwise closed to prevent ingress of air. Vent 20 comprises a slot that extends diametrically across the lower end or bottom of container 12, being formed by the tearing away of the tail of the molded plastic body when the molds start to open after the bottle has been made.

To the extent thus far described, container 10 is similar to that disclosed in U.S. application Ser. No. 08/807,944 assigned to the assignee hereof and incorporated herein by reference for purposes of background. When a pump or spray dispenser is secured to container finish 18, product within liner 14 can be dispensed by operation of the pump or spray dispenser. As product is dispensed, negative pressure within liner 14 causes liner 14 to separate from container body 12. Atmospheric air enters vent 20 to permit such separation. Thus, the liner collapses as the product is dispensed, while body 12 retains its original configuration due to its inherent rigidity as well as separation of the liner from the inner surface of the body. Container 10 preferably is manufactured by a co-extrusion and blow molding process of the type illustrated in U.S. Pat. Nos. 3,781,395, 3,767,747 and 3,978,184.

In accordance with the present invention, relatively rigid outer plastic body 12 includes, and preferably consists essentially of, a thin outer layer 22 and a thicker inner layer 24. Likewise, liner 14 in accordance with the present invention includes, and preferably consists essentially of, an outer layer 26 and an inner layer 28. These layers are formed in an otherwise conventional co-extrusion and blow-molding operation, such as those disclosed in the U.S. patents cited immediately above. Outer layer 22 of container body 12 preferably consists of high-density polyethylene (HDPE) and has a thickness not greater than 0.004 inches. Inner layer 24 of container body 12 preferably comprises 70% virgin HDPE and 30% process regrind (i.e., regrind of HDPE, LLDPE, nylon, nylon blend or EVOH, and previous regrind from process spoils and scrap). Inner layer 24 preferably has a thickness in the range of 0.006 to 0.020 inches. Thus, outer layer 22 provides the desired appearance to the overall container, while inner layer 24 provides structural rigidity using regrind materials.

Outer layer 26 of liner 14 preferably is of composition selected from the group consisting of nylon, nylon blends and EVOH, having a thickness in the range of 0.002 to 0.004 inches. Inner layer 28 preferably comprises linear low density polyethylene (LLDPE), having a thickness in the preferred range of 0.002 to 0.004 inches. Liner 14 also includes an adhesive, which preferably is blended with the LLDPE material of inner layer 28 in a ratio of 80% virgin LLDPE to 20% adhesive. This adhesive secures inner layer 28 to outer layer 26. Alternatively, the adhesive may be provided in the form of a thin layer between layers 26, 28, which would use less adhesive material and prevent contact between the adhesive material and the product contained within liner 14. The nylon, nylon blend or EVOH composition of outer layer 26 provides ready delamination of liner 14 from container body 12, and also provides a barrier against loss of product, gas migration or loss of product flavorants. The LLDPE material of inner liner 28 provides high flexibility while resisting formation of stress cracks and pinholes as liner 14 collapses.

Tests have been conducted on containers in accordance the present invention using a crystalized nylon material in layer 26 and a liquid soap product. Projected annual product loss was 0.1% at 73° F., 1.3% at 100° F. and 2.5% at 120° F.

It will therefore be recognized that a multilayer container has been provided in accordance with the present invention, which fully satisfies all of the objects and aims previously set forth. The two-layer construction of the inner liner or bag 14 provides improved barrier properties while eliminating stress cracks and pinholes. The two-layer construction of the liner 14 also provides improved flexibility and strength. The overall container exhibits a reduced annual product weight loss. No pre-delamination is required between the liner and container body when product is dispensed. Process regrind is recycled into the package. The process does not need to use nitrogen as support air.

What is claimed is:

1. A multilayer container for dispensing product which comprises: a relatively rigid outer plastic body and a relatively flexible inner plastic liner for holding product to be dispensed, said relatively rigid outer body has a dispensing opening at one end and an atmospheric vent at an opposing end, and said relatively flexible inner liner opens at said dispensing opening, said outer body comprising a radially outer layer of virgin polyethylene, and a radially inner layer that is thicker than said outer layer and includes process regrind, said relatively flexible inner liner including a radially outer layer of barrier material adjacent to said inner layer of said body and not adhered to said inner layer of said body, wherein said outer layer of barrier material is selected from the group consisting of nylon, nylon blends and EVOH, and a radially inner layer of LLDPE, said liner being adjacent to and easily separable from said inner layer of said body.

2. The container set forth in claim 1 wherein said inner liner includes an adhesive bonding said inner layer of said liner to said outer layer of said liner.

3. The container set forth in claim 2 wherein said adhesive is blended with said polyethylene of said inner layer of said liner.

4. The container set forth in claim 2 wherein said outer layer of said liner is selected from the group consisting of nylon, nylon blends and EVOH.

5. The container set forth in claim 2 wherein said inner and outer layers of said liner each have a thickness in the range of 0.006 to 0.020 inches.

6. The container set forth in claim 2 wherein said outer layer of said body is virgin HDPE, and said inner layer of said body is comprised of virgin HDPE and process regrind.

7. The container set forth in claim 6 wherein said inner layer of said body is 70% virgin HDPE and 30% process regrind.

8. The container set forth in claim 8 wherein said outer layer of said body is not more than 0.004 inches thick, and said inner layer of said body is in the range of 0.010 to 0.020 inches thick.

9. A multilayer container for dispensing product that comprises: a relatively rigid outer body and a relatively flexible inner liner for holding product to be dispensed, said relatively rigid outer body has a dispensing opening at one end and an atmospheric vent at an opposing end, and said relatively flexible inner liner opens at said dispensing opening, said outer body consisting essentially of a radially outer layer of virgin HDPE, and a radially inner layer thicker than said outer layer and consisting essentially of a mixture of HDPE and process regrind, said inner liner consisting essentially of a radially outer layer selected from the group consisting of nylon, nylon blends and EVOH, a radially inner layer of LLDPE, and an adhesive securing said inner and outer layers of said liner, said outer layer of said liner being adjacent to and easily separable from said inner layer of said body.

10. The container set forth in claim 9 wherein said adhesive is blended with said inner layer of said liner.

11. The container set forth in claim 9 wherein said inner and outer layers of said liner each have a thickness in the range of 0.002 to 0.004 inch.

12. The container set forth in claim 9 wherein said inner layer of said body is at least 70% virgin HDPE and not more than 30% regrind.

13. The container set forth in claim 9 wherein said outer layer of said body is not more than 0.004 inches thick, and said inner layer of said body is in the range of 0.010 to 0.020 inches thick.

14. A multilayer container for dispensing product which comprises: an outer plastic body and an inner plastic liner for holding product to be dispensed, said outer plastic body consisting essentially of a radially outer layer of virgin polyolefin and a radially inner layer consisting essentially of a mixture of polyolefin and process regrind, said inner plastic liner being more flexible and less rigid than said outer plastic body, wherein the relatively rigid outer body has a dispensing opening at one end and an atmospheric vent at an opposing end, and said relatively flexible inner liner opens at said dispensing opening, said inner liner consisting essentially of a radially outer layer of barrier material selected from the group consisting of nylon, nylon blends and EVOH, a radially inner layer of LLDPE, and an adhesive securing said inner and outer layers of said liner to each other, said outer layer of said liner being adjacent to and easily separable from said inner layer of said body, not being adhered to an inner surface of said outer plastic body.

15. The container set forth in claim 14 wherein said polyolefin is polyethylene.

16. The container set forth in claim 15 wherein said radially inner layer of said outer plastic body is thicker, than said radially outer layer of said outer plastic body.

* * * * *